(12) United States Patent
Song et al.

(10) Patent No.: US 12,110,390 B2
(45) Date of Patent: Oct. 8, 2024

(54) SOLID DISPERSION, PREPARATION METHOD THEREFOR, CHAIN-EXTENDED POLYURETHANE USING SAME, AND EPOXY RESIN COMPOSITION COMPRISING SAME

(71) Applicant: SAMYANG CORPORATION, Seoul (KR)

(72) Inventors: Gwang Seok Song, Jeonju-si (KR); Hoon Ryu, Daejeon (KR); Jun Seop Im, Hwaseong-si (KR); Seung Hyun Yoo, Daejeon (KR); Won Hyun Jeon, Seoul (KR)

(73) Assignee: SAMYANG CORPORATION, Seoul (KR)

( * ) Notice: Subject to any disclaimer, the term of this patent is extended or adjusted under 35 U.S.C. 154(b) by 555 days.

(21) Appl. No.: 17/054,286

(22) PCT Filed: May 10, 2019

(86) PCT No.: PCT/KR2019/005643
§ 371 (c)(1),
(2) Date: Nov. 10, 2020

(87) PCT Pub. No.: WO2019/216700
PCT Pub. Date: Nov. 14, 2019

(65) Prior Publication Data
US 2021/0238413 A1  Aug. 5, 2021

(30) Foreign Application Priority Data

May 11, 2018 (KR) .................. 10-2018-0054295
May 21, 2018 (KR) .................. 10-2018-0057683
May 24, 2018 (KR) .................. 10-2018-0058790

(51) Int. Cl.
| | | |
|---|---|---|
| C08L 75/08 | (2006.01) | |
| C08J 3/09 | (2006.01) | |
| C08K 3/04 | (2006.01) | |
| C08L 63/00 | (2006.01) | |
| C09K 23/00 | (2022.01) | |

(52) U.S. Cl.
CPC .............. *C08L 75/08* (2013.01); *C08J 3/095* (2013.01); *C08K 3/042* (2017.05); *C08L 63/00* (2013.01); *C09K 23/00* (2022.01); *C08J 2301/02* (2013.01); *C08J 2363/00* (2013.01); *C08J 2375/08* (2013.01); *C08J 2401/02* (2013.01); *C08J 2463/00* (2013.01); *C08J 2475/08* (2013.01); *C08L 2205/16* (2013.01)

(58) Field of Classification Search
CPC ...... C08L 2205/16; C08L 63/00; C08L 75/08; C08J 2475/08; C08J 2463/00; C08J 2401/02; C08J 2375/08; C08J 2363/00; C08J 2301/02; C08J 3/095; C09K 23/00; C08K 3/042

USPC ......................................................... 523/206
See application file for complete search history.

(56) References Cited

U.S. PATENT DOCUMENTS

| | | | |
|---|---|---|---|
| 7,820,772 B2 | 10/2010 | Usui et al. | |
| 2004/0143035 A1 | 7/2004 | Goebelt et al. | |
| 2005/0069648 A1 | 3/2005 | Maruyama | |
| 2009/0197903 A1* | 8/2009 | Kiekens | A61K 9/1652 |
| | | | 514/272 |
| 2016/0346217 A1* | 12/2016 | White | A61K 9/4891 |
| 2017/0313852 A1 | 11/2017 | Wartig et al. | |

FOREIGN PATENT DOCUMENTS

| | | |
|---|---|---|
| JP | 2001-49187 A | 2/2001 |
| JP | 2004-66235 A | 3/2004 |
| JP | 2006-7491 A | 1/2006 |
| JP | 4583373 B2 | 11/2010 |
| JP | 2015-113426 A | 6/2015 |
| KR | 1999-0073761 A | 10/1999 |
| KR | 10-0622336 B1 | 9/2006 |
| KR | 10-2013-0023254 A | 3/2013 |
| KR | 10-2013-0096307 A | 8/2013 |
| KR | 10-2013-0111313 A | 10/2013 |
| KR | 10-2014-0026304 A | 3/2014 |
| KR | 10-2017-0082565 A | 7/2017 |

OTHER PUBLICATIONS

Jeong et al., KR 1999-0073761 A machine translation in English, Oct. 5, 1999. (Year: 1999).*
Ogasawara et al., KR 10-2014-0026304 A machine translation in English, Mar. 5, 2014. (Year: 2014).*

(Continued)

*Primary Examiner* — David T Karst
(74) *Attorney, Agent, or Firm* — Birch, Stewart, Kolasch & Birch, LLP

(57) ABSTRACT

The present invention relates to a solid dispersion, a preparation method therefor, a chain-extended polyurethane using same, and an epoxy resin composition comprising same and, more particularly, to a solid dispersion in which an inorganic or organic material-derived isotropic or anisotropic substance is used as a dispersoid and dispersed at room temperature in a solid-phase dispersion medium such as polyols and sugars, whereby the dispersion can be easily stored and used, reduce transportation cost, prevent or alleviate the aggregation or precipitation caused during the storage of products, with the results of working efficiency improvement and processing cost reduction, and, when applied to polyurethane, can increase strength and provide an improved strength, compared to conventional curing agent, a preparation method therefor, a chain-extended polyurethane using same, and an epoxy resin composition comprising same.

17 Claims, No Drawings

(56) References Cited

OTHER PUBLICATIONS

International Search Report, issued in PCT/KR2019/005643, PCT/ISA/210, dated Aug. 20, 2019.

\* cited by examiner

SOLID DISPERSION, PREPARATION METHOD THEREFOR, CHAIN-EXTENDED POLYURETHANE USING SAME, AND EPOXY RESIN COMPOSITION COMPRISING SAME

TECHNICAL FIELD

The present invention relates to a solid dispersion, a method for preparing the same, a chain-extended polyurethane using the same, and an epoxy resin composition comprising the same, and more specifically, to a solid dispersion which is possible to store and use easily, reduce transportation costs and prevent or improve the agglomeration and settling that occurs during product storage, enabling improved work efficiency, reduced process costs and improved strength when applied to polyurethane and providing improved strength compared to conventional curing agents by using an isotropic and/or anisotropic material derived from inorganic or organic material as a dispersoid and dispersing it in a dispersion medium such as polyol and sugar, which is solid at room temperature, a method for preparing the same, a chain-extended polyurethane using the same, and an epoxy resin composition comprising the same.

BACKGROUND ART

Isotropic and/or anisotropic materials derived from inorganic or organic materials are used as a main material in applications such as lightweight materials, hybrid materials, surface protectors, conductive pastes, conductive inks, sensors, precision analysis devices, optical memories, liquid crystal display devices, nanomagnets, thermoelectric media, high-performance catalysts for fuel cells, organic solar cells, nanoglass devices, abrasives, drug carriers, environmental catalysts, paints, printing inks, inkjet inks, resists for color filters, ink for writing tools and the like. At this time, the isotropic and/or anisotropic materials derived from inorganic or organic materials are used industrially as a material that contributes to improved processing properties and product properties, quality stabilization and yield improvement during manufacturing by preparing and using a dispersion comprising them as fine particles in an aqueous dispersion medium or a non-aqueous dispersion medium.

However, with the aim of changing the material of the dispersoid, miniaturizing the particle size or controlling the particle shape, it is difficult to stabilize the dispersoid, so that the dispersoid may agglomerate or settle in a short time in the dispersion medium. The problems of aggregation and settling of dispersoids lead to a decrease in productivity, processing properties, handling properties and product yield, as well as a decrease in properties, material properties and quality of the final product in the manufacture of a dispersion. In addition, it is known to cause undesirable phenomena such as decrease in transparency, gloss and coloring power, color stains and cracks in appearance. A dispersant is used to suppress aggregation and settling of such dispersoids and to achieve dispersion stabilization.

Previously, as disclosed in Korean Patent Laid-open Publication No. 10-2013-0023254 or 10-2013-0096307, a review has been made to obtain a stable dispersion composition by suppressing aggregation of the dispersion by using a dispersant. However, in terms of diversification of the dispersoid and dispersion medium, micronization of the particle size of the dispersoid, diversification of the particle shape, high quality of the final product, improvement of productivity and high demand for processing characteristics, the previously proposed dispersant cannot sufficiently meet the required characteristics.

The biggest problem with existing dispersion compositions is that when a dispersion composition using water as a dispersion medium is applied to polyurethane resins and epoxy resins, the process of manufacturing a master batch of water and polyol or a master batch of water and epoxy is additionally required and that a surfactant is needed to prevent agglomeration of dispersoids.

Accordingly, there is a need for the development of a dispersion and dispersion composition capable of preventing or improving the aggregation and settling of the dispersion without the use of a separate dispersant or surfactant, a chain extender for applying the dispersion to polyurethane, etc. and an epoxy resin composition using the dispersion as a curing agent.

CONTENTS OF THE INVENTION

Problems to be Solved

The purpose of the present invention is to provide a solid dispersion which is possible to store and use easily, reduce transportation costs and prevent or improve the agglomeration and settling that occurs during product storage, enabling improved work efficiency, reduced process costs, improved strength when applied to polyurethane and providing improved strength compared to conventional curing agents by using an isotropic and/or anisotropic material derived from inorganic or organic material as a dispersoid and dispersing it in a dispersion medium such as polyol and sugar, which is solid at room temperature, a method for preparing the same, a chain-extended polyurethane using the same, and an epoxy resin composition comprising the same.

Technical Means

In order to achieve the technical purpose, in the first aspect, the present invention provides a solid dispersion comprising a dispersoid and a dispersion medium in which the dispersoid is dispersed, wherein the dispersoid is an organic particle, an inorganic particle or a mixture thereof, and the dispersion medium is a non-aqueous dispersion medium in a solid state at room temperature.

In another aspect, the present invention provides a dispersion composition comprising the above solid dispersion.

In still another aspect, the present invention provides a method for preparing a solid dispersion comprising a step of mixing a dispersoid and a dispersion medium; and a step of melting the dispersion medium in a mixture, wherein the dispersoid is an organic particle, an inorganic particle or a mixture thereof, and the dispersion medium is a non-aqueous dispersion medium in a solid state at room temperature.

In still another aspect, the present invention provides a chain-extended polyurethane, which is prepared by the reaction of a polyurethane prepolymer and the above solid dispersion.

In still another aspect, the present invention provides a method for preparing a chain-extended polyurethane comprising (1) a step of adding the above solid dispersion to the polyurethane prepolymer; and (2) a step of reacting the resulting mixture of step (1).

In still another aspect, the present invention provides an epoxy resin composition comprising an epoxy resin; and the above solid dispersion.

In still another aspect, the present invention provides a method for preparing an epoxy resin composition comprising a step of mixing the epoxy resin and the above solid dispersion.

In still another aspect, the present invention provides a cured product obtained by curing the above epoxy resin composition.

In still another aspect, the present invention provides a molded article comprising the above cured product.

Effect of the Invention

The solid dispersion according to the present invention in which isotropic and/or anisotropic materials derived from inorganic or organic materials are dispersed can reduce or eliminate agglomeration during product storage, thereby reducing process input time when using a product (solid dispersion), reducing or eliminating an additional process or time for re-dispersing the agglomerated product and improving work efficiency since there is little or no concern for the worker's labor and safety during such additional process. In addition, the solid dispersion of the present invention is evenly dispersed in a large amount of dispersoid, and when it is used as a chain extender for polyurethane, it is possible to provide improved strength to polyurethane as compared to a conventional chain extender. When it is used as a curing agent, improved strength compared to a conventional curing agent can be provided to the cured product of the epoxy resin.

CONCRETE MODE FOR CARRYING OUT THE INVENTION

The present invention is explained in more detail below.

The present invention relates to a solid dispersion comprising a dispersoid and a dispersion medium in which the dispersoid is dispersed, wherein the dispersoid is an organic particle, an inorganic particle or a mixture thereof, and the dispersion medium is a non-aqueous dispersion medium in a solid state at room temperature.

In addition, according to another aspect of the present invention, the present invention provides a dispersion composition comprising the above solid dispersion.

The solid dispersion or dispersion composition of the present invention may be solid at room temperature. In the present specification, room temperature is a normal temperature in the range of 20±5° C., and may be, for example, 25° C. Although not particularly limited, the solid dispersion of the present invention may be used as a solid dispersion at room temperature for chain extension or a solid dispersion at room temperature for curing.

The solid dispersion of the present invention comprises a dispersoid dispersed in a dispersion medium. When the dispersoid comprised in the solid dispersion is applied to the manufacture of a polymer or a cured product (for example, the manufacture of a polyurethane or an epoxy cured product), the dispersoid may play a role of improving electrical properties, thermal properties, and/or mechanical properties of the prepared polymer or cured product (for example, a polyurethane or an epoxy cured product) according to its type, but it is not limited thereto.

The dispersoid particles dispersed in the dispersion medium of the present invention may be selected from an inorganic particle, an organic particle or mixtures thereof.

For example, as inorganic particles, iron, aluminum, chromium, nickel, cobalt, zinc, tungsten, indium, tin, palladium, zirconium, titanium, copper, silver (e.g., silver particles, silver nanowires, silver nanorods, etc.), gold (e.g., gold particles, gold nanowires, gold nanorods, etc.), platinum, an alloy of two or more metals or a mixture of two or more of them may be used. At that time, in order to stably extract the above inorganic particles from the medium, the inorganic particles may be coated with a protective agent such as alkanic acids, fatty acids, hydroxycarboxylic acids, alicyclic carboxylic acids, aromatic carboxylic acids, alkenyl succinic anhydrides, thiols, phenol derivatives, amines, amphiphilic polymers, high-molecular-weight surfactants, and low-molecular-weight surfactants, etc.

In addition, kaolin, clay, talc, mica, bentonite, dolomite, calcium silicate, magnesium silicate, asbestos, calcium carbonate, magnesium carbonate, barium carbonate, calcium sulfate, barium sulfate, aluminum sulfate, aluminum hydroxide, iron hydroxide, aluminum silicate, zirconium oxide, magnesium oxide, aluminum oxide, titanium oxide, iron oxide, zinc oxide, antimony trioxide, indium oxide, indium tin oxide, silicon carbide, silicon nitride, boron nitride, barium titanate, diatomite, carbon black, graphite, rock wool, glass wool, glass fiber, graphene, carbon fiber, carbon nanofibers, carbon nanotubes (single-walled carbon nanotubes, double-walled carbon nanotubes, multi-walled carbon nanotubes, etc.) may be used as inorganic particles, and a mixture of two or more among the above inorganic particles may be used, but they are not limited thereto.

In addition, as the organic particles, organic pigments such as azo-based compounds, diazo-based compounds, condensed azo-based compounds, thioindigo-based compounds, indanthrone-based compounds, quinacridone-based compounds, anthraquinone-based compounds, benzimidazolone-based compounds, perylene-based compounds, phthalocyanine-based compounds, anthrapyridine-based compounds or dioxazine-based compounds; polymer resins such as polyethylene resin, polypropylene resin, polyester resin, nylon resin, polyamide resin, aramid resin, acrylic resin, vinylon resin, urethane resin, melamine resin, polystyrene resin, polylactic acid, acetate fiber, cellulose (for example, nanocellulose fibril, nanocellulose crystal, etc.), hemicellulose, lignin, chitin, chitosan, starch, polyacetal, polycarbonate, polyphenylene ether, polyether ether ketone, polyether ketone, polybutylene terephthalate, polyethylene naphthalate, polybutylene naphthalate, polysulfone, polyphenylene sulfide, polyimide; or a mixture of two or more thereof may be used, but they are not limited thereto.

The dispersoid particles dispersed in the dispersion medium of the present invention may be crystalline or amorphous. Furthermore, the dispersoid particles dispersed in the dispersion medium of the present invention may be isotropic particles, anisotropic particles or fibrous particles.

The dispersoid particles dispersed in the dispersion medium of the present invention may be preferably one or more selected from the group consisting of nanocellulose fibrils, nanocellulose crystals, graphene, graphite, carbon nanotubes, carbon nanofibers, silver particles, silver nanowires, silver nanorods, gold particles, gold nanowires, gold nanorods, or a combination thereof, but they are not limited thereto.

In the present invention, the dispersoid particles may be obtained by a known method. As a method of preparing fine particles of dispersoids, there are two kinds of a top-down method in which coarse particles are mechanically crushed and then refined, and a bottom-up method in which several unit particles are generated and are formed into particles through a cluster state in which they are aggregated. Even those prepared by any method can be preferably used. In addition, as a method for preparing the fine particles, either a wet method or a dry method may be used. In addition, the bottom-up method includes a physical method and a chemical method, but any method may be used.

In order to describe the bottom-up method in more detail, a method of preparing metal nanoparticles among the dispersoid particles is exemplified. Among the bottom-up methods, as a representative example of the physical method, there is a gas evaporation method in which a bulk metal is evaporated in an inert gas and cooled and condensed by collision with the gas to generate nanoparticles. In addition, as a chemical method, there is a liquid phase reduction method in which metal ions are reduced in the presence of a protective agent in a liquid phase, and the produced zero-valent metal is stabilized in a nano size, or a thermal decomposition method of a metal complex. As the liquid phase reduction method, a chemical reduction method, an electrochemical reduction method, a photoreduction method or a method in which a chemical reduction method and a light irradiation method are combined can be used.

In addition, the dispersoid particles that can be preferably used in the present invention may be obtained by any of a top-down method and a bottom-up method as described above, and may be prepared under any environment of an aqueous liquid phase, a non-aqueous liquid phase and a gas phase.

The solid dispersion of the present invention comprises a dispersion medium for dispersing a dispersoid. When the dispersion medium comprised in the solid dispersion is applied to the production of polyurethane, it can play a role of extending the chain of the polyurethane, and when the dispersion medium comprised in the solid dispersion is applied to the curing of the epoxy resin, it can play a role of curing the epoxy resin.

The dispersion medium usable in the present invention may be a non-aqueous dispersion medium that is solid at room temperature but can change to a liquid state when the temperature is raised to a temperature exceeding room temperature. By using such a non-aqueous dispersion medium, when the solid dispersion is stored at room temperature, dispersion stabilization can be achieved by preventing or improving the agglomeration or settling of the dispersoid.

The non-aqueous dispersion medium may be preferably one capable of extending the chain of polyurethane or curing the epoxy resin. For example, one or more selected from the group consisting of saccharides, polyether polyols, polyester polyols, hydrogenated sugars, alkane diols, amine-based compounds, phenol-based compounds, imidazole-based compounds, acid anhydride-based compounds, anhydrosugar alcohols or combinations thereof may be used.

Saccharides include monosaccharides, disaccharides, and polysaccharides, and the type of monosaccharide is not particularly limited. It can be used without limitation as long as it is a solid at room temperature and is converted to a liquid state when the temperature is raised above the melting point exceeding room temperature. For example, glucose, fructose, galactose, ribose or a mixture thereof may be used as the monosaccharide.

The type of the disaccharide is not particularly limited, and it can be used without limitation, as long as it is a solid at room temperature and is converted to a liquid state when the temperature is raised above the melting point exceeding room temperature. For example, maltose, sucrose, lactose or a mixture thereof may be used as the disaccharide.

The type of the polysaccharide is not particularly limited, and it can be used without limitation as long as it is a solid at room temperature and is converted to a liquid state when heated above the melting point exceeding room temperature. For example, oligosaccharide, cellulose, starch, glycogen or a mixture thereof may be used as the polysaccharide.

The type of the polyether polyol is not particularly limited, and it can be used without limitation as long as it is a solid at room temperature and is converted to a liquid state when the temperature is raised above the melting point exceeding room temperature. For example, modified polypropylene glycol, polytetramethylene ether glycol (polytetrahydrofuran) or mixtures thereof and the like may be used as the polyether polyol.

The kind of the polyester polyol is not particularly limited, and it can be used without limitation as long as it is a solid at room temperature and is converted to a liquid state when the temperature is raised above the melting point exceeding room temperature. For example, butylene adipate diol, 1,6-hexane adipate diol or mixtures thereof and the like may be used as the polyester polyol.

The type of the hydrogenated sugar is not particularly limited, and it can be used without limitation as long as it is a solid at room temperature and is converted to a liquid state when the temperature is raised above the melting point exceeding room temperature. For example, tetritol, pentitol, hexitol, heptitol or a mixture thereof may be used as the hydrogenated sugar, and preferably hexitol such as one selected from the group consisting of sorbitol, mannitol, iditol, galactitol or a mixture thereof may be used.

The type of the alkanediol is not particularly limited, and it can be used without limitation as long as it is a solid at room temperature and is converted to a liquid state when the temperature is raised above the melting point exceeding room temperature. For example, one selected from the group consisting of 1,4-butanediol, 1,6-hexanediol, 1,9-nonanediol or a mixture thereof may be used as the alkanediol.

However, when a chemical dispersion medium is used, environmental issues may arise. For example, when a phenol-based compound is used, there is a problem in that a small amount of free phenol is detected after curing. And when an amine-based compound is used, there is a limitation in work due to odor.

According to one embodiment, it may be preferable to use anhydrosugar alcohol (e.g., monohydrosugar alcohol, dianhydrosugar alcohol or a mixture thereof) as the non-aqueous dispersion medium of the present invention. In this case, there are no restrictions on work due to odor and problems in which chemical substances are eluted after curing.

The type of the amine-based compound is not particularly limited, and can be used without limitation as long as it is a solid at room temperature and is converted to a liquid state when the temperature is raised above the melting point exceeding room temperature. For example, one selected from the group consisting of poly(ethylene glycol)diamine, (R)-(+)-1,1'-binaphthyl-2,2'-diamine, (S)-(−)-1,1'-binaphthyl-2,2'-diamine, 1,1'-binaphthyl-2,2'-diamine, 4-ethoxybenzene-1,2-diamine, Diamido-dPEG®-diamine, (1R, 2R)—N,N'-dimethyl-1,2-diphenylethane-1,2-diamine, N,N-bis(4-butylphenyl)benzene-1,4-diamine or mixtures thereof may be used as the amine-based compound.

The kind of the phenol-based compound is not particularly limited, and it can be used without limitation as long as it is a solid at room temperature and is converted to a liquid state when the temperature is raised above the melting point exceeding room temperature. For example, one selected from the group consisting of 2,3-xylenol, 2,4-xylenol, 2,5-xylenol, 2,6-xylenol, 3,4-xylenol, 3,5-xylenol, 2,5-dimethylphenol, 2,3-dimethylphenol or mixtures thereof may be used as the phenol-based compound.

The type of the imidazole-based compound is not particularly limited, and it can be used without limitation as long as it is a solid at room temperature and is converted to a liquid state when the temperature is raised above the melting point exceeding room temperature. For example, one selected from the group consisting of imidazole, 1-(2-hydroxyethyl)imidazole, imidazole trifluoro methanesulfonate, imidazole-2-carboxylic acid, 4-bromo-1H-imidazole, N-benzyl-2-nitro-1H-imidazole-1-acetamide, 2-chloro-1H-imidazole, imidazole-d, imidazole-N, imidazole-2-C,N or a mixture thereof may be used as the imidazole-based compound.

The kind of the acid anhydride-based compound is not particularly limited, and it can be used without limitation as long as it is a solid at room temperature and is converted to a liquid state when the temperature rises above the melting point exceeding room temperature. For example, one selected from the group consisting of (2-dodecen-1-yl) succinic anhydride, maleic anhydride, succinic anhydride, phthalic anhydride, glutaric anhydride, 3,4,5,6-tetrahydrophthalic anhydride, diglycolic anhydride, itaconic anhydride, trans-1,2-cyclohexanedicarboxylic anhydride, 2,3-dimethylmaleic anhydride, 3,3-tetramethylene glutaric anhydride, stearic anhydride, cis-aconitic anhydride, trimellitic anhydride chloride, phenylsuccinic anhydride, 3,3-dimethylglutaric anhydride, methylsuccinic anhydride or a mixture thereof may be used as the acid anhydride-based compound.

The type of the monohydrosugar alcohol is not particularly limited, and it can be used without limitation as long as it is a solid at room temperature and is converted to a liquid state when the temperature is raised above the melting point exceeding room temperature. For example, one selected from the group consisting of tetritan, pentitan, hexitane, heptitan or a mixture thereof may be used as the monohydrosugar alcohol, and preferably hexitane such as one selected from the group consisting of sorbitan, mannitan, iditan, galactan or a mixture thereof may be used.

The type of the dianhydrosugar alcohol is not particularly limited, and it can be used without limitation as long as it is a solid at room temperature and is converted to a liquid state when the temperature rises above the melting point exceeding room temperature. For example, dianhydrosugar hexitol and the like may be used as the dianhydrosugar alcohol, and preferably one selected from the group consisting of isosorbide, isomannide, isoidide or mixtures thereof may be used.

In one embodiment, when the solid dispersion of the present invention is a solid dispersion at room temperature for chain extension, one or more selected from the group consisting of anhydrosugar alcohol, hydrogenated sugar, alkane diol or a combination thereof may be used as the dispersion medium.

In one embodiment, when the solid dispersion of the present invention is a solid dispersion at room temperature for curing, one or more selected from the group consisting of amine-based compounds, phenol-based compounds, imidazole-based compounds, acid anhydride-based compounds, anhydrosugar alcohols or a combination thereof may be used as a dispersion medium. Preferably, one or a mixture of two or more selected from anhydrosugar alcohols such as monohydrosugar alcohols and dianhydrosugar alcohols may be used.

Regarding the solid dispersion of the present invention, the content of the dispersoid may vary depending on the type of dispersoid used and may be, based on 100 parts by weight of the dispersion medium, 0.0001 parts by weight or more, 0.01 parts by weight or more, 0.05 parts by weight or more, 0.1 parts by weight or more, 0.5 parts by weight or more or 1 part by weight or more, and 95 parts by weight or less, 90 parts by weight or less, 85 parts by weight or less, 80 parts by weight or less, 60 parts by weight or less, or 50 parts by weight or less—for example, 0.0001 parts by weight to 95 parts by weight, preferably 0.05 parts by weight to 80 parts by weight, but it is not limited thereto. If the content of the dispersoid is too small, the strength improvement of the polyurethane to which the solid dispersion is applied may be weak, and the physical and electrical properties due to the dispersoid effect in the epoxy resin cured product to which the solid dispersion is applied may be weak. If the content of the dispersoid is too much, it may not exist in a state that is evenly dispersed in the solid dispersion but may exist in a state where the dispersoids are tangled with each other.

In another aspect, the present invention provides a method for preparing a solid dispersion comprising a step of mixing a dispersoid and a dispersion medium; and a step of melting the dispersion medium in a mixture, wherein the dispersoid is an organic particle, an inorganic particle or a mixture thereof, and the dispersion medium is a non-aqueous dispersion medium in a solid state at room temperature.

Although not particularly limited, in the step of melting the dispersion medium in a mixture, the mixture may be melted while removing moisture by applying a vacuum at a temperature equal to or higher than the melting point of the dispersion medium. Furthermore, the melted mixture may then be cooled to room temperature to obtain a solid dispersion.

In the present specification, the components described in the method for preparing the solid dispersion are the same as those of the above-described solid dispersion.

In another aspect, the present invention provides a method for preparing a chain-extended polyurethane comprising (1) a step of adding the solid dispersion according to the present invention to the polyurethane prepolymer; and (2) a step of reacting the resulting mixture of step (1).

In the method for preparing a chain-extended polyurethane of the present invention, the polyurethane prepolymer may be obtained by reacting a polyol and a polyisocyanate—for example, adding a polyol sufficiently vacuum-dried for 12 to 36 hours and polyisocyanate, preferably 20 to 28 hours, at 50 to 100° C., preferably 70 to 90° C. to a four-neck reactor and then reacting the polyol and polyisocyanate for 0.1 to 5 hours, preferably 0.5 to 2 hours while maintaining a temperature of 50 to 100° C., preferably 50 to 70° C. under a nitrogen atmosphere.

Polyols that can be used in the present invention are not particularly limited, but polyether polyols can be used. For example, polyethylene glycol, polypropylene glycol, polytetramethylene glycol, random copolymers or block copolymers of ethylene oxide and propylene oxide, a random copolymer or a block copolymer of ethylene oxide and butylene oxide can be used.

The polyisocyanate compound usable in the present invention is not particularly limited, but specifically may be aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-methylenediphenyl diisocyanate (MDI), 2,4-diphenylmethane diisocyanate, 4,4'-diisocyanato biphenyl, 3,3'-dimethyl-4,4'-diisocyanato biphenyl, 3,3'-dimethyl-4,4'-diisocyanato diphenylmethane, 1,5-naphthylene diisocyanate, 4,4',4''-triphenylmethane triisocyanate, m-isocyanatophenylsulfonyl isocyanate and p-isocyanato phenyl sulfonyl isocyanate;

aliphatic polyisocyanate compounds such as ethylene diisocyanate, tetramethylene diisocyanate, hexamethylene diisocyanate (HDI), dodecamethylene diisocyanate, 1,6,11-undecan triisocyanate, 2,2,4-trimethylhexamethylene diisocyanate, lysine diisocyanate, 2,6-diisocyanato methylcaproate, bis(2-isocyanatoethyl)fumarate, bis(2-isocyanatoethyl)carbonate, 2-isocyanatoethyl-2,6-diisocyanato hexanoate: alicyclic polyisocyanate compounds, such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornene diisocyanate and 2,6-norbornene diisocyanate, etc. These polyisocyanate compounds may be used alone or in combination of two or more.

In the method for preparing a chain-extended polyurethane of the present invention, after adding a solid dispersion for chain extension to the polyurethane prepolymer, by putting them in a coated mold and curing for 10 to 30 hours, preferably 15 to 25 hours at a temperature of 80 to 200° C., preferably 100 to 150° C., a chain-extended polyurethane can be prepared.

In still another aspect, the present invention provides a chain-extended polyurethane, which is prepared by the reaction of a polyurethane prepolymer and the above solid dispersion of the present invention.

In the present specification, each component described in the chain-extended polyurethane and the method for preparing thereof is the same as those of the above-described solid dispersion.

In still another aspect, the present invention provides an epoxy resin composition comprising an epoxy resin; and the above solid dispersion.

In one embodiment, the epoxy resin may be those selected from the group consisting of bisphenol A-epichlorohydrin resin, epoxy novolac resin, alicyclic epoxy resin, aliphatic epoxy resin, bicyclic epoxy resin, glycidyl ester type epoxy resin, brominated epoxy resin, bio-based epoxy resin, epoxidized soybean oil or a combination thereof, but it is not limited thereto.

In another embodiment, the epoxy resin may be novolac-type epoxy resins such as phenol novolac-type epoxy resin and cresol novolac-type epoxy resin: bisphenol-type epoxy resins such as bisphenol A-type epoxy resin and bisphenol F-type epoxy resin; aromatic glycidylamine-type epoxy resins such as N,N-diglycidyl aniline, N,N-diglycidyl toluidine, diaminodiphenylmethane-type glycidylamine and aminophenol-type glycidylamine; hydroquinone-type epoxy resin: biphenyl-type epoxy resin: stilbene-type epoxy resin; triphenolmethane-type epoxy resin: triphenolpropane-type epoxy resin: alkyl-modified triphenolmethane-type epoxy resin: triazine nucleus-containing epoxy resin; dicyclopentadiene-modified phenol-type epoxy resin: naphthol-type epoxy resin; naphthalene-type epoxy resin: aralkyl-type epoxy resins such as phenol aralkyl-type epoxy resins having a phenylene and/or biphenylene skeleton, and naphthol aralkyl-type epoxy resins having a phenylene and/or biphenylene skeleton; aliphatic epoxy resins such as alicyclic epoxy such as vinylcyclohexene dioxide, dicyclopentadiene oxide, alicyclic diepoxy-adipate or a combination thereof, but it is not limited thereto.

In another embodiment, the epoxy resin may be selected from the group consisting of glycidyl ether having one epoxy group such as bisphenol F-type epoxy resin, cresol novolac-type epoxy resin, phenol novolac-type epoxy resin, biphenyl-type epoxy resin, stilbene-type epoxy resin, hydroquinone-type epoxy resin, naphthalene skeleton-type epoxy resin, tetraphenylolethane-type epoxy resin, diphenyl phosphate (DPP)-type epoxy resin, tris(hydroxyphenyl) methane-type epoxy resin, dicyclopentadienephenol-type epoxy resin, diglycidyl ether of bisphenol A ethylene oxide adduct, diglycidyl ether of bisphenol A propylene oxide adduct, diglycidyl ether of bisphenol A, phenyl glycidyl ether, cresyl glycidyl ether: nuclear-hydrogenated epoxy resins, which are nuclear-hydrogenated products of these epoxy resins; or a combination thereof, but is not limited thereto.

In the epoxy resin composition of the present invention, the content ratio of the epoxy resin and the solid dispersion may be the value that makes the equivalent ratio of the solid dispersion to the epoxy resin (the equivalent of the solid dispersion/the equivalent of the epoxy resin)—for example, in the range of 0.25 to 1.75, more specifically in the range of 0.75 to 1.25, and more specifically, in the range of 0.95 to 1.05. If the equivalent of the solid dispersion relative to the equivalent of the epoxy resin is too small, there may be a problem in that the mechanical strength decreases and the physical properties in terms of thermal and adhesive strength decrease. On the contrary, if the equivalent of the solid dispersion to the equivalent of the epoxy resin is excessive, there may be a problem in that physical properties are deteriorated in terms of mechanical, thermal and adhesive strength.

For the curing accelerating effect, the epoxy resin composition of the present invention may further include a curing catalyst.

The curing catalyst usable in the present invention may be selected from the group consisting of amine compounds (e.g., tertiary amines) such as benzyldimethylamine, tris(dimethylaminomethyl)phenol and dimethylcyclohexylamine; imidazole compounds such as 1-cyanoethyl-2-ethyl-4-methylimidazole, 2-ethyl-4-methylimidazole and 1-benzyl-2-methylimidazole; organophosphorus compounds such as triphenylphosphine and triphenyl phosphite; quaternary phosphonium salts such as tetraphenylphosphonium bromide and tetra-n-butylphosphonium bromide; diazabicycloalkenes such as 1,8-diazabicyclo[5.4.0]undecene-7 and organic acid salts thereof; organometallic compounds such as zinc octylate, tin octylate, and aluminum acetylacetone complex; quaternary ammonium salts such as tetraethylammonium bromide and tetrabutylammonium bromide; boron compounds such as boron trifluoride and triphenylborate; metal halides such as zinc chloride and tin chloride; latent curing catalyst (e.g., a high-melting-point dispersion-type latent amine adduct in which dicyandiamide and amine are added to an epoxy resin, etc.: a microcapsule-type latent catalyst in which the surface of an imidazole-based, phosphorus-based or phosphine-based accelerator is coated with a polymer: amine salt-type latent catalyst: high-temperature dissociating, thermally cation-polymerizable latent catalysts such as Lewis acid salts and Bronsted acid salts), or combinations thereof, but is not limited thereto.

In one embodiment, the curing catalyst may be selected from the group consisting of an amine compound, an imidazole compound, an organophosphorus compound or a combination thereof.

When a curing catalyst is included in the epoxy resin composition of the present invention, the amount used may be 0.01 parts by weight to 1.0 parts by weight, more specifically 0.05 parts by weight to 0.5 parts by weight, even more specifically 0.08 parts by weight to 0.2 parts by weight based on 100 parts by weight of the total of the epoxy resin and the solid dispersion, but is not limited thereto. If the amount of the curing catalyst used is too small, the curing reaction of the epoxy resin may not proceed sufficiently, resulting in a problem of deteriorating mechanical and thermal properties. On the contrary, if the amount of the curing catalyst is too large, the curing reaction progresses slowly even while the epoxy resin composition is stored, so there may be a problem wherein the viscosity increases.

The epoxy resin composition of the present invention may further comprise one or more additive components commonly used in the epoxy resin composition, if necessary.

As the additive components, for example, one selected from the group consisting of antioxidants, UV absorbers, fillers, resin modifiers, silane coupling agents, diluents, colorants, antifoaming agents, defoamers, dispersants, viscosity modifiers, gloss modifiers, wetting agents, conductivity imparting agents or a combination thereof can be used.

The antioxidant may be used to further improve the heat resistance stability of the resulting cured product, and is not particularly limited. For example, a phenol-based antioxidant (dibutylhydroxytoluene, etc.), a sulfur-based antioxidant (mercaptopropionic acid derivative, etc.), phosphorus-based antioxidants (9,10-dihydro-9-oxa-10-phosphaphenanthrene-10-oxide, etc.) or combinations thereof may be used. The content of the antioxidant in the composition may be 0.01 to 10 parts by weight, 0.05 to 5 parts by weight or 0.1 to 3 parts by weight, based on 100 parts by weight of the total of the epoxy resin and the solid dispersion.

Although there is no specific limitation of said UV absorber, for example, benzotriazole-based UV absorbers such as TINUBIN P and TINUVIN 234 manufactured by BASF Japan Ltd.: triazine UV absorbers such as TINUVIN 1577ED; a hindered amine UV absorber such as CHIMAS-SOLV 2020FDL or a combination thereof, may be used. The content of the UV absorber in the composition may be 0.01 to 10 parts by weight, 0.05 to 5 parts by weight or 0.1 to 3 parts by weight, based on 100 parts by weight of the total of the epoxy resin and the solid dispersion.

The filler is used for the main purpose of improving the mechanical properties of the cured product by blending it with an epoxy resin or a curing agent. In general, as the amount of addition increases, the mechanical properties are improved. Inorganic fillers include extenders such as talc, sand, silica, calcium carbonate and the like; reinforcing fillers such as mica, quartz and glass fiber: some having special uses such as quartz powder, graphite, alumina and aerosil (the purpose of imparting thixotropic properties); the metals such as of aluminum, aluminum oxide, iron, iron oxide, copper, etc. contributing to the thermal expansion coefficient, abrasion resistance, thermal conductivity, and adhesion; antimony oxide (SB203) that imparts flame retardancy: barium titanate; and organic materials including fillers for weight reduction such as fine plastic balls (phenol resin, urea resin, etc.). In addition, as a filler having reinforcing properties, various glass fibers or chemical fiber cloths can be handled as fillers in a broad sense in the manufacture of laminates. Fine particles with a large unit surface area are used to impart thixotropy (which refers to having the property in which it is in a liquid state when flowing and a solid state when stationary to prevent the resin impregnated on a vertical surface by immersion or impregnated on a vertical surface from spilling or loss during curing) to the resin. For example, colloidal silica (aerosil) or bentonite-based clay is used.

In one embodiment, the filler is not particularly limited. For example, it may be one selected from the group consisting of glass fiber, carbon fiber, titanium oxide, alumina, talc, mica, aluminum hydroxide or a combination thereof. The content of the filler in the composition may be 0.01 to 80 parts by weight, 0.01 to 50 parts by weight or 0.1 to 20 parts by weight, based on 100 parts by weight of the total of the epoxy resin and the solid dispersion.

The resin modifier is not particularly limited. For example, it may be flexibility-imparting agents such as polypropylene glycidyl ether, polymeric fatty acid polyglycidyl ether, polypropylene glycol, urethane prepolymer, etc. The content of the resin modifier in the composition may be 0.01 to 80 parts by weight, 0.01 to 50 parts by weight or 0.1 to 20 parts by weight, based on 100 parts by weight of the total of the epoxy resin and the solid dispersion.

The silane coupling agent is not particularly limited. For examples, it may be chloropropyltrimethoxysilane, vinyl trichlorosilane, γ-methacryloxypropyltrimethoxysilane, γ-aminopropyltriethoxysilane or a combination thereof. The content of the silane coupling agent in the composition may be 0.01 to 20 parts by weight, 0.05 to 10 parts by weight or 0.1 to 5 parts by weight, based on 100 parts by weight of the total of the epoxy resin and the solid dispersion.

The diluent is used for the main purpose of lowering the viscosity by adding it to an epoxy resin or a curing agent, which serves to improve flowability, defoaming property, improve penetration into parts and add effectively a filler during use. Diluents generally do not volatilize unlike solvents and remain in the cured product upon curing the resin, and are classified into reactive and non-reactive diluents. Here, the reactive diluent has one or more epoxy groups and participates in the reaction to enter a crosslinked structure in the cured product, and the non-reactive diluent is only physically mixed and dispersed in the cured product. Commonly used reactive diluents include butyl glycidyl ether (BGE), phenyl glycidyl ether (PGE), aliphatic glycidyl ether (C12-C14), modified-tert-carboxylic glycidyl ester and the like. Dibutylphthalate (DBP), dioctylphthalate (DOP), nonyl-phenol, hysol and the like are generally used as non-reactive diluents.

In one embodiment, the diluent is not particularly limited, but, for example, n-butyl glycidyl ether, phenyl glycidyl ether, glycidyl methacrylate, vinylcyclohexene dioxide, diglycidyl aniline, glycerin triglycidyl ether or a combination thereof may be used. The content of the diluent in the composition may be 0.01 to 80 parts by weight, 0.01 to 50 parts by weight or 0.1 to 20 parts by weight, based on 100 parts by weight of the total of the epoxy resin and the solid dispersion.

Pigments or dyes are used as colorants to add color to the resin. As commonly used pigments, coloring agents such as titanium dioxide, cadmium red, shining green, carbon black, chromium green, chromium yellow, navy blue and shining blue are used.

In addition, various additives such as an antifoaming agent and a defoamer used for the purpose of removing bubbles from the resin, a dispersing agent to increase the dispersing effect between the resin and the pigment, a wetting agent to improve the adhesion between the epoxy resin and the material, and a viscosity modifier, a gloss modifier for controlling the gloss of a resin, an additive for improving adhesion, an additive for imparting electrical properties, etc. can be used.

The curing method of the epoxy resin composition of the present invention is not particularly limited, and for example, a conventionally known curing apparatus such as a closed curing furnace or a tunnel furnace capable of continuous curing can be used. The heating method used for the curing is not particularly limited but may be performed by a conventionally known method such as hot air circulation, infrared heating, high frequency heating, etc.

Curing temperature and curing time may be in the range of 30 seconds to 10 hours at 80° C. to 250° C. In one embodiment, after pre-curing under the conditions of 80° C. to 120° C. and 0.5 hours to 5 hours, post-curing may be performed under the conditions of 120° C. to 180° C., 0.1 hour to 5 hours. In one embodiment, for a short time curing, it may be cured under conditions of 150° C. to 250° C. and 30 seconds to 30 minutes.

In still another aspect, the present invention provides a method for preparing an epoxy resin composition comprising a step of mixing the epoxy resin and the above solid dispersion.

In still another aspect, the present invention provides a cured product obtained by curing the above epoxy resin composition.

In still another aspect, the present invention provides a molded article comprising the above cured product.

The present invention is explained in more detail through the following Examples and Comparative Examples. However, the scope of the present invention is not limited thereby in any manner.

EXAMPLES

1. Preparation of a Solid Dispersion for Chain Extension and Chain-Extended Polyurethane Preparation of a solid dispersion for chain extension Example 1-A1: Solid Dispersion Comprising Nanocellulose Fibrils and Anhydrosugar Alcohols 100 g of isosorbide (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 80° C. which is equal to or higher than the melting point of isosorbide. Subsequently, the melted mixture was cooled to room temperature to prepare isosorbide in which nanocellulose fibrils were dispersed (solid dispersion).

Example 1-A2: Solid Dispersion Comprising Nanocellulose Fibrils and Hydrogenated Sugars 100 g of sorbitol (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 100° C. which is equal to or higher than the melting point of sorbitol. Subsequently, the melted mixture was cooled to room temperature to prepare sorbitol in which nanocellulose fibrils were dispersed (solid dispersion).

Example 1-A3: Solid Dispersion Comprising Nanocellulose Fibrils and Alkane Diol 100 g of 1,4-butanediol (Sigma Aldrich) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 40° C. which is equal to or higher than the melting point of 1,4-butanediol. Subsequently, the melted mixture was cooled to room temperature to prepare 1,4-butanediol in which nanocellulose fibrils were dispersed (solid dispersion).

Example 1-A4: Solid Dispersion Comprising Graphene and Anhydrosugar Alcohol 100 g of isosorbide (Samyang Corporation) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 80° C. which is equal to or higher than the melting point of isosorbide. Subsequently, the melted mixture was cooled to room temperature to prepare isosorbide in which graphene was dispersed (solid dispersion).

Example 1-A5: Solid Dispersion Comprising Graphene and Hydrogenated Sugar 100 g of sorbitol (Samyang Corporation) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 100° C. which is equal to or higher than the melting point of sorbitol. Subsequently, the melted mixture was cooled to room temperature to prepare sorbitol in which graphene was dispersed (solid dispersion).

Example 1-A6: Solid Dispersion Comprising Graphene and Alkane Diol 100 g of 1,4-butanediol (Sigma Aldrich) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 40° C. which is equal to or higher than the melting point of 1,4-butanediol. Subsequently, the melted mixture was cooled to room temperature to prepare 1,4-butanediol in which graphene was dispersed (solid dispersion).

Comparative Example 1-A1: Liquid Dispersion Comprising Nanocellulose Fibrils and Polypropylene Glycol 100 g of polypropylene glycol in liquid form at room temperature (PPG-3000, Kumho Petrochemical) and 100 g of an aqueous solution dispersed in 1% by weight of nanocellulose fibrils (KB101, Asia Nano Cellulose Co., Ltd.) were added to a rotary evaporator and uniformly mixed. Then, a vacuum was applied to remove moisture to prepare polypropylene glycol in which nanocellulose fibrils were dispersed (liquid dispersion).

Comparative Example 1-A2: Liquid Dispersion Comprising Graphene and Polypropylene Glycol 100 g of polypropylene glycol in liquid form at room temperature (PPG-3000, Kumho Petrochemical) and 100 g of an aqueous solution in which graphene was dispersed at 1.5 mg/mL (WDG, MExplorer Co., Ltd.) were added to a rotary evaporator and uniformly mixed. Then, a vacuum was applied to remove moisture to prepare a polypropylene glycol in which graphene was dispersed (liquid dispersion).

Preparation of Chain-Extended Polyurethane

Example 1-B1: Preparation of Polyurethane Using a Solid Dispersion Comprising Nanocellulose Fibrils and Anhydrosugar Alcohol After adding 100 g (0.1 mol) of poly(tetramethylene ether glycol) (PTMEG, molecular weight: 1,000) and 50.5 g (0.2 mol) of 4,4'-methylene diphenyl diisocyanate (MDI) which were sufficiently vacuum-dried at 80° C. for 24 hours to a four-neck reactor, a polyurethane prepolymer was prepared by reacting the mixture for 1 hour while maintaining a temperature of 60° C. under a nitrogen atmosphere. Then, when the NCO % of the polyurethane prepolymer was measured to reach the theoretical NCO %, 14.6 g of isosorbide prepared in Example 1-A1 in which the nanocellulose fibrils were dispersed was added as a chain extender, the mixture was put into the coated mold and then cured at 110° C. for 16 hours to prepare a chain-extended polyurethane.

Example 1-B2: Preparation of Polyurethane Using a Solid Dispersion Comprising Graphene and Anhydrosugar Alcohol Except for using the dispersion prepared in Example 1-A4 (isosorbide in which graphene was dispersed) instead of the dispersion prepared in Example 1-A1 (isosorbide in which nanocellulose fibrils were dispersed) as a chain extender, a chain-extended polyurethane was prepared in the same manner as in Example 1-B1.

Example 1-B3: Preparation of Polyurethane Using a Solid Dispersion Comprising Nanocellulose Fibrils and Alkane Diol Except for using the dispersion prepared in Example 1-A3 (1,4-butanediol in which nanocellulose fibrils are dispersed) instead of the dispersion prepared in Example 1-A1 (isosorbide in which nanocellulose fibrils were dispersed) as a chain extender, a chain-extended polyurethane was prepared in the same manner as in Example 1-B1.

Example 1-B4: Preparation of Polyurethane Using a Solid Dispersion Comprising Graphene and Alkane Diol Except for using the dispersion prepared in Example 1-A6 (1,4-butanediol in which graphene was dispersed) instead of the dispersion prepared in Example 1-A1 (isosorbide in which nanocellulose fibrils were dispersed) as a chain extender, a chain-extended polyurethane was prepared in the same manner as in Example 1-B1.

Example 1-B5: Preparation of Polyurethane Using a Solid Dispersion Containing Nanocellulose Fibrils and Hydrogenated Sugar Except for using the dispersion prepared in Example 1-A2 (sorbitol in which nanocellulose fibrils were dispersed) instead of the dispersion prepared in Example 1-A1 (isosorbide in which nanocellulose fibrils were dispersed) as a chain extender, a chain-extended polyurethane was prepared in the same manner as in Example 1-B1.

Example 1-B6: Preparation of Polyurethane Using a Solid Dispersion Comprising Graphene and Hydrogenated Sugar Except for using the dispersion prepared in Example 1-A5 (sorbitol in which graphene was dispersed) instead of the dispersion prepared in Example 1-A1 (isosorbide in which nanocellulose fibrils were dispersed) as a chain extender, a chain-extended polyurethane was prepared in the same manner as in Example 1-B1.

Comparative Example 1-B1: Preparation of Polyurethane Using Anhydrosugar Alcohol as a Chain Extender Except for using isosorbide instead of the dispersion prepared in Example 1-A1 (isosorbide in which nanocellulose fibrils were dispersed) as a chain extender, a chain-extended polyurethane was prepared in the same manner as in Example 1-B1.

Comparative Example 1-B2: Preparation of Polyurethane Using Anhydrosugar Alcohol as a Chain Extender and Adding Nanocellulose Fibrils Separately After adding 100 g (0.1 mol) of poly(tetramethylene ether glycol) (PTMEG, molecular weight: 1,000) and 0.146 g of nanocellulose fibrils which were sufficiently vacuum-dried at 80° C. for 24 hours were added to a four-neck reactor, and then slowly stirred under a nitrogen atmosphere. Subsequently, 50.5 g (0.2 mol) of 4,4'-methylene diphenyl diisocyanate (MDI) was added to a four-neck reactor under a nitrogen atmosphere, and then reacted for 1 hour while maintaining a temperature of 60° C. to prepare a polyurethane prepolymer. Then, when the NCO % of the polyurethane prepolymer was measured to reach the theoretical NCO %, 14.6 g of isosorbide was added as a chain extender, and the mixture was put in the coated mold and then cured at 110° C. for 16 hours to prepare a chain-extended polyurethane.

Comparative Example 1-B3: Preparation of Polyurethane Using Anhydrosugar Alcohol as a Chain Extender and Adding Graphene Separately Except for adding 0.146 g of graphene instead of 0.146 g of nanocellulose fibrils, a chain-extended polyurethane was prepared in the same manner as in Comparative Example 1-B2.

Comparative Example 1-B4: Preparation of Polyurethane Using a Liquid Dispersion Comprising Nanocellulose Fibrils and Polypropylene Glycol Except for using the dispersion prepared in Comparative Example 1-A1 (polypropylene glycol in which nanocellulose fibrils are dispersed) instead of the dispersion prepared in Example 1-A1 (isosorbide in which nanocellulose fibrils are dispersed) as a chain extender, a chain-extended polyurethane was prepared in the same manner as in Example 1-B1.

Comparative Example 1-B5: Preparation of Polyurethane Using a Liquid Dispersion Containing Graphene and Polypropylene Glycol Except for using the dispersion prepared in Comparative Example 1-A2 (polypropylene glycol in which graphene was dispersed) instead of the dispersion prepared in Example 1-A1 (isosorbide in which nanocellulose fibrils were dispersed) as a chain extender, a chain-extended polyurethane was prepared in the same manner as in Example 1-B1.

[Method of Evaluating Tensile Stress]

For the polyurethane specimens prepared in Examples 1-B1 to 1-B6 and Comparative Examples 1-B1 to 1-B5, tensile stress was measured using a universal tensile tester according to ASTM D412, and the results are shown in Table 2 below.

TABLE 1

| Categories | | Redispersibility | Storage stability |
| --- | --- | --- | --- |
| Examples | 1-A1 | ○○ | ○○ |
|  | 1-A2 | ○○ | ○○ |
|  | 1-A3 | ○○ | ○○ |
|  | 1-A4 | ○○ | ○○ |
|  | 1-A5 | ○○ | ○○ |
|  | 1-A6 | ○○ | ○○ |
| Comparative | 1-A1 | ○ | X |
| Examples | 1-A2 | ○ | X |

TABLE 2

| | Comparative Examples | | | | | Examples | | | | | |
| --- | --- | --- | --- | --- | --- | --- | --- | --- | --- | --- | --- |
| Categories | 1-B1 | 1-B2 | 1-B3 | 1-B4 | 1-B5 | 1-B1 | 1-B2 | 1-B3 | 1-B4 | 1-B5 | 1-B6 |
| Tensile stress (MPa) | 24.3 | Not measurable due to aggregation | | 30 | 31 | 33 | 38 | 30 | 35 | 34 | 37 |

<Method of Measuring Physical Properties>
[Method of Evaluating Redispersibility]

After storing the dispersions prepared in Examples 1-A1 to 1-A6 and Comparative Examples 1-A1 to 1-A2 at room temperature for 24 hours, 10 g of each dispersion was placed in a vial containing 15 ml of water and stirred for 1 hour using a magnetic bar to prepare a specimen. Subsequently, the degree of dispersion of the dispersoid in the prepared specimen was observed with the naked eye, and the results are shown in Table 1 below.
- ○○: The dispersed state of the dispersoid is the same as that immediately after preparation of the dispersion composition.
- ○: The dispersed state of the dispersoid is a state in which small lumps are floating compared to immediately after preparation of the dispersion composition.
- x: The dispersed state of the dispersoid is a state in which big lumps are floating compared to immediately after preparation of the dispersion composition.
- xx: The dispersoid is insoluble in water.

[Method of Evaluating Storage Stability]

Specimens were prepared in the same manner as described in the method of evaluating redispersibility. Subsequently, each of the prepared specimens was stored at room temperature for 1 hour, and then the degree of aggregation and settling of the dispersoid was visually observed, and the results are shown in Table 1 below.
- ○○: The dispersoid does not aggregate and does not settle.
- ○: A small amount of dispersoid agglomerates and settles.
- x: Most of the dispersoid agglomerates and settles.

As described in Table 1 above, in the case of Examples 1-A1 to 1-A6 according to the present invention, the dispersion was present in a solid state at room temperature and the storage stability was excellent, so it was found that long-term storage was easy and redispersability was excellent.

However, in the case of the dispersion in which the dispersion medium is in a liquid state at room temperature (Comparative Examples 1-A1 and 1-A2), the dispersoids entangled with each other, resulting in agglomeration in the form of small lumps, which resulted in poor redispersibility. Also, it was found that the storage stability was poor due to the occurrence of aggregation and settling during long-term storage.

In addition, as described in Table 2 above, in the case of Examples 1-B1 to 1-B6 according to the present invention, it was found that the tensile stress of the chain-extended polyurethane was remarkably improved to 30 Mpa or more by using a dispersion in which the dispersoid (nanocellulose fibrils or graphene) is evenly dispersed.

However, in the case of Comparative Example 1-B1 in which anhydrosugar alcohol alone was used as a chain extender, the tensile stress was significantly inferior to those of the Examples. In the case of Comparative Examples 1-B2 and 1-B3 in which anhydrosugar alcohol alone was used as a chain extender while an additive (nanocellulose fibrils or graphene) was mixed with the polyol of the prepolymer, the additive was not evenly dispersed and the tensile stress could not be measured due to the aggregation of the polyurethanes to which the dispersions were applied.

In addition, in the case of Comparative Examples 1-B4 and 1-B5 using the dispersion in which the dispersoid was dispersed, but existed in a liquid state at room temperature, the dispersoids were entangled with each other, resulting in agglomeration and settling in the form of small lumps. Therefore, an additional process of stirring must be performed before using the specimen. When stored for a long period of time, there is a problem in that the dispersoid is agglomerated and is not well dispersed even by stirring.

2. Preparation of Solid Dispersion for Curing and Epoxy Resin Composition

Preparation of a solid dispersion for curing

Example 2-A1: Solid Dispersion for Curing Comprising Nanocellulose Fibrils and Anhydrosugar Alcohol 100 g of isosorbide (Samyang Corporation) as a dispersion medium and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 80° C. which is equal to or higher than the melting point of isosorbide. Subsequently, the melted mixture was cooled to room temperature to prepare isosorbide in which nanocellulose fibrils were dispersed (solid dispersion for curing).

Example 2-A2: Solid Dispersion for Curing Comprising Graphene and Anhydrosugar Alcohol 100 g of isosorbide (Samyang Corporation) as a dispersion medium and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 80° C. which is equal to or higher than the melting point of isosorbide. Subsequently, the melted mixture was cooled to room temperature to prepare isosorbide in which graphene was dispersed (solid dispersion for curing).

Example 2-A3: Solid Dispersion for Curing Comprising Nanocellulose Fibrils and Amine-Based Compounds 10 g of (1R,2R)—N,N'-dimethyl-1,2-diphenylethane-1,2-diamine (Sigma Aldrich) as a dispersion medium and 10 g of an aqueous solution in which 1% by weight of nanocellulose fibrils are dispersed (KB101, Asia Nano Cellulose Co., Ltd.) was added to the a rotary evaporator and uniformly mixed. Then, the mixture was melted while removing moisture by applying a vacuum under a temperature condition of 80° C. which is equal to or higher than the melting point of (1R,2R)—N,N'-dimethyl-1,2-diphenylethane-1,2-diamine. Subsequently, the melted mixture was cooled to room temperature to prepare (1R,2R)—N,N'-dimethyl-1,2-diphenylethane-1,2-diamine in which nanocellulose fibrils were dispersed (solid dispersion for curing).

Example 2-A4: Solid Dispersion for Curing Comprising Graphene and Amine-Based Compounds 10 g of (1R,2R)—N,N'-dimethyl-1,2-diphenylethane-1,2-diamine (Sigma Aldrich) as a dispersion medium and 10 g of an aqueous solution in which graphene is dispersed at 1.5 mg/mL (WDG, MExplorer Co., Ltd.) was added to a rotary evaporator and uniformly mixed. Then, the mixture was melted while removing moisture by applying a vacuum under a temperature condition of 80° C. which is equal to or higher than the melting point of (1R,2R)—N,N'-dimethyl-1,2-diphenylethane-1,2-diamine. Subsequently, the melted mixture was cooled to room temperature to prepare (1R,2R)—N,N'-dimethyl-1,2-diphenylethane-1,2-diamine in which graphene was dispersed (solid dispersion for curing).

Example 2-A5: Solid Dispersion for Curing Comprising Nanocellulose Fibrils and Phenol-Based Compounds 10 g of 2,3-xylenol (Sigma Aldrich) as a dispersion medium and 10 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 80° C. which is equal to or higher than the melting point of 2,3-xylenol. Subsequently, the melted mixture was cooled to room temperature to prepare 2,3-xylenol in which nanocellulose fibrils were dispersed (solid dispersion for curing).

Example 2-A6: Solid Dispersion for Curing Comprising Graphene and Phenol-Based Compounds 10 g of 2,3-xylenol (Sigma Aldrich) as a dispersion medium and 10 g of an aqueous solution in which graphene was dispersed at 1.5 mg/mL (WDG, Mexplorer Co., Ltd.) were added to a rotary evaporator and uniformly mixed. Then, the mixture was melted while removing moisture by applying a vacuum under a temperature condition of 80° C. which is equal to or higher than the melting point of 2,3-xylenol. Subsequently, the melted mixture was cooled to room temperature to prepare 2,3-xylenol in which graphene was dispersed (solid dispersion for curing).

Example 2-A7: Solid Dispersion for Curing Comprising Nanocellulose Fibrils and Imidazole-Based Compounds 10 g of imidazole (Sigma Aldrich) as a dispersion medium and 10 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 100° C. which is equal to or higher than the melting point of imidazole. Subsequently, the melted mixture was cooled to room temperature to prepare imidazole in which nanocellulose fibrils were dispersed (solid dispersion for curing).

Example 2-A8: Solid Dispersion for Curing Comprising Graphene and Imidazole-Based Compounds 10 g of imidazole (Sigma Aldrich) as a dispersion medium and 10 g of an aqueous solution in which graphene was dispersed at 1.5 mg/mL (WDG, MExplorer, Co., Ltd.) were added to a rotary evaporator and uniformly mixed. Then, the mixture was melted while removing moisture by applying a vacuum under a temperature condition of 100° C. which is equal to or higher than the melting point of imidazole. Subsequently, the melted mixture was cooled to room temperature to prepare imidazole in which graphene was dispersed (solid dispersion for curing).

Example 2-A9: Solid Dispersion for Curing Comprising Nanocellulose Fibrils and Acid Anhydride-Based Compounds 100 g of maleic anhydride (Sigma Aldrich) as a dispersion medium and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 80° C. which is equal to or higher than the melting point of maleic anhydride. Subsequently, the melted mixture was cooled to room temperature to prepare maleic anhydride in which nanocellulose fibrils were dispersed (solid dispersion for curing).

Example 2-A10: Solid Dispersion for Curing Comprising Graphene and Acid Anhydride-Based Compounds 100 g of maleic anhydride (Sigma Aldrich) as a dispersion medium and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 80° C. which is equal to or higher than the melting point of maleic anhydride. Subsequently, the melted mixture was cooled to room temperature to prepare maleic anhydride in which graphene was dispersed (solid dispersion for curing).

Comparative Example 2-A1: Curing Agent Comprising Nanocellulose Fibrils and Polypropylene Glycol 100 g of polypropylene glycol (PPG-3000, Kumho Petrochemical) in liquid form at room temperature and 100 g of an aqueous solution in which 1% by weight of nanocellulose fibrils were dispersed (KB101, Asia Nano Cellulose Co., Ltd.) added to a rotary evaporator and uniformly mixed. Then, a vacuum was applied to remove moisture to prepare polypropylene glycol in which nanocellulose fibrils were dispersed (liquid curing agent).

Comparative Example 2-A2: Curing Agent Comprising Graphene and Polypropylene Glycol 100 g of polypropylene glycol (PPG-3000, Kumho Petrochemical) in liquid form at room temperature and 100 g of an aqueous solution in which graphene was dispersed at 1.5 mg/mL (WDG, MEexplorer Co., Ltd.) were added to a rotary evaporator and uniformly mixed. Then, a vacuum was applied to remove moisture to prepare a polypropylene glycol in which graphene was dispersed (liquid curing agent).

Preparation of Epoxy Resin Composition

Example 2-B1: Preparation of an Epoxy Resin Composition Using a Solid Dispersion for Curing Comprising Nanocellulose Fibrils and Anhydrosugar Alcohol Diglycidyl ether of bisphenol A (DGEBA)-based bifunctional epoxy resin (YD-128, Kukdo Chemical, epoxy equivalent weight (EEW): 187 g/eq, 1 equivalent) and isosorbide (Samyang Corporation, hydroxy equivalent weight (HEW): 73 g/eq, 1 equivalent) in which the nanocellulose fibrils are dispersed, prepared in Example 2-A1 were mixed, and 0.1 parts by weight of N,N-dimethylbutylamine (DMBA, Sigma Aldrich) was added based on 100 parts by weight of the mixture as a catalyst to prepare an epoxy resin composition.

Subsequently, the epoxy resin composition was put into a mold coated with a teflon film and cured stepwise at 100° C. for 1 hour, 120° C. for 1 hour, 150° C. for 3 hours and 180° C. for 1 hour.

Example 2-B2: Preparation of an Epoxy Resin Composition Using a Solid Dispersion for Curing Comprising Graphene and Anhydrosugar Alcohol Except for using isosorbide (Samyang Corporation, hydroxy equivalent weight (HEW): 73 g/eq, 1 equivalent) in which the graphene was dispersed, prepared in Example 2-A2 as a curing agent instead of the isosorbide in which the nanocellulose fibrils were dispersed, prepared in Example 2-A1, the epoxy resin composition was prepared in the same manner as in Example 2-B1 and then cured.

Example 2-B3: Preparation of an Epoxy Resin Composition Using a Solid Dispersion for Curing Comprising Nanocellulose Fibrils and Amine-Based Compounds Except for using (1R,2R)—N,N'-dimethyl-1,2-diphenylethane-1,2-diamine in which the nanocellulose fibrils were dispersed, prepared in Example 2-A3, as a curing agent instead of the isosorbide in which the nanocellulose fibrils were dispersed, prepared in Example 2-A1, an epoxy resin composition was prepared in the same manner as in Example 2-B1 and then cured.

Example 2-B4: Preparation of an Epoxy Resin Composition Using a Solid Dispersion for Curing Comprising Graphene and Amine-Based Compounds Except for using (1R,2R)—N,N'-dimethyl-1,2-diphenylethane-1,2-diamine in which the graphene was dispersed, prepared in Example 2-A4, as a curing agent instead of the isosorbide in which the nanocellulose fibrils were dispersed, prepared in Example 2-A1, an epoxy resin composition was prepared in the same manner as in Example 2-B1 and then cured.

Example 2-B5: Preparation of an Epoxy Resin Composition Using a Solid Dispersion for Curing Comprising Nanocellulose Fibrils and Phenol-Based Compounds Except for using 2,3-xylenol in which the nanocellulose fibrils were dispersed, prepared in Example 2-A5, as a curing agent instead of the isosorbide in which the nanocellulose fibrils were dispersed, prepared in Example 2-A1, an epoxy resin composition was prepared in the same manner as in Example 2-B1 and then cured.

Example 2-B6: Preparation of an Epoxy Resin Composition Using a Solid Dispersion for Curing Comprising Graphene and Phenol-Based Compounds Except for using 2,3-xylenol in which the graphene was dispersed, prepared in Example 2-A6, as a curing agent instead of the isosorbide in which the nanocellulose fibrils were dispersed, prepared in Example 2-A1, an epoxy resin composition was prepared in the same manner as in Example 2-B1 and then cured.

Example 2-B7: Preparation of an Epoxy Resin Composition Using a Solid Dispersion for Curing Comprising Nanocellulose Fibrils and Imidazole-Based Compounds Except for using the imidazole in which nanocellulose fibrils were dispersed, prepared in Example 2-A7, as a curing agent instead of the isosorbide in which the nanocellulose fibrils were dispersed, prepared in Example 2-A1, an epoxy resin composition was prepared in the same manner as in Example 2-B1 and then cured.

Example 2-B8: Preparation of an Epoxy Resin Composition Using a Solid Dispersion for Curing Comprising Graphene and Imidazole-Based Compounds Except for using the imidazole in which graphene was dispersed, prepared in Example 2-A8, as a curing agent instead of the isosorbide in which the nanocellulose fibrils were dispersed, prepared in Example 2-A1, an epoxy resin composition was prepared in the same manner as in Example 2-B1 and then cured.

Example 2-B9: Preparation of an Epoxy Resin Composition Using a Solid Dispersion for Curing Comprising Nanocellulose Fibrils and Acid Anhydride-Based Compounds Except for using the maleic anhydride in which the nanocellulose fibrils were dispersed, prepared in Example 2-A9, as a curing agent instead of the isosorbide in which the nanocellulose fibrils were dispersed, prepared in Example 2-A1, an epoxy resin composition was prepared in the same manner as in Example 2-B1 and then cured.

Example 2-B10: Preparation of an Epoxy Resin Composition Using a Solid Dispersion for Curing Comprising Graphene and Acid Anhydride-Based Compounds Except for using the maleic anhydride in which graphene was dispersed, prepared in Example 2-A10, as a curing agent instead of the isosorbide in which the nanocellulose fibrils were dispersed, prepared in Example 2-A1, an epoxy resin composition was prepared in the same manner as in Example 2-B1 and then cured.

Comparative Example 2-B1: Preparation of an Epoxy Resin Composition Using Anhydrosugar Alcohol as a Curing Agent Except for using isosorbide (Samyang Corporation, hydroxyl equivalent weight (HEW): 73 g/eq, 1 equivalent) as a curing agent instead of the isosorbide in which the nanocellulose fibrils were dispersed, prepared in Example 2-A1, an epoxy resin composition was prepared in the same manner as in Example 2-B1 and then cured.

Comparative Example 2-B2: Preparation of an Epoxy Resin Composition Using Anhydrosugar Alcohol as a Curing Agent and Adding Separate Nanocellulose Fibrils Diglycidyl ether of bisphenol A (DGEBA)-based bifunctional epoxy resin (YD-128, Kukdo Chemical, epoxy equivalent weight (EEW): 187 g/eq, 1 equivalent), isosorbide (Samyang Corporation, hydroxy equivalent weight (HEW): 73 g/eq, 1 equivalent) and 0.73 g of nanocellulose fibrils were mixed, and 0.1 parts by weight of N,N-dimethylbutylamine (DMBA, Sigma Aldrich) was added based on 100 parts by weight of the mixture as a catalyst to prepare an epoxy resin composition.

Subsequently, the epoxy resin composition was put into a mold coated with a teflon film and cured stepwise at 100° C. for 1 hour, 120° C. for 1 hour, 150° C. for 3 hours and 180° C. for 1 hour.

Comparative Example 2-B3: Preparation of an Epoxy Resin Composition Using Anhydrosugar Alcohol as a Curing Agent and Adding Graphene Separately Except for adding 0.73 g of graphene instead of 0.73 g of nanocellulose fibrils, an epoxy resin composition was prepared in the same manner as in Comparative Example 2-B2 and then cured.

Comparative Example 2-B4: Preparation of an Epoxy Resin Composition Using a Curing Agent Comprising Nanocellulose Fibrils and Polypropylene Glycol Except for using the curing agent prepared in Comparative Example 2-A1 (polypropylene glycol in which nanocellulose fibrils were dispersed) instead of the curing agent prepared in Example 2-A1 (isosorbide in which nanocellulose fibrils were dispersed) as a curing agent, an epoxy resin composition was prepared in the same manner as in Example 2-B1 and then cured.

Comparative Example 2-B5: Preparation of an Epoxy Resin Composition Using a Curing Agent Comprising Graphene and Polypropylene Glycol Except for using the curing agent prepared in Comparative Example 2-A2 (polypropylene glycol in which graphene was dispersed) instead of the curing agent prepared in Example 2-A1 (isosorbide in which nanocellulose fibrils were dispersed) as a curing agent, an epoxy resin composition was prepared in the same manner as in Example 2-B1 and then cured.

<Method of Measuring Physical Properties>

[Method of Evaluating Redispersibility]

After storing the solid dispersions for curing prepared in Examples 2-A1 to 2-A10 and Comparative Examples 2-A1 to 2-A2 at room temperature for 24 hours, 10 g of each solid dispersion for curing was placed in a vial containing 15 ml of water and stirred for 1 hour using a magnetic bar to prepare a specimen. Subsequently, the degree of dispersion of the dispersoid in the prepared specimen was observed with the naked eye, and the results are shown in Table 3 below.

○○: The dispersed state of the dispersoid is the same as that immediately after preparation of the solid dispersion for curing.

○○: The dispersed state of the dispersoid is a state in which small lumps are floating compared to immediately after preparation of the solid dispersion for curing.

x: The dispersed state of the dispersoid is a state in which big lumps are floating compared to immediately after preparation of the solid dispersion for curing.

xx: The dispersoid is insoluble in water.

[Method of Evaluating Storage Stability]

Specimens were prepared in the same manner as described in the method of evaluating redispersibility. Subsequently, each of the prepared specimens was stored at room temperature for 1 hour, and then the degree of aggregation and settling of the dispersoid was visually observed, and the results are shown in Table 3 below.

○○: The dispersoid does not aggregate and does not settle.

○: A small amount of dispersoid agglomerates and settles.

x: Most of the dispersoid agglomerates and settles.

[Method of Evaluating Tensile Stress]

For the specimen of the cured product of epoxy resin composition prepared in Examples 2-B1 to 2-B10 and Comparative Examples 2-B1 to 2-B5, tensile stress was measured using a universal tensile tester according to ASTM D412. Five times tensile stress was measured for each specimen, and the average value of the five times is shown in Table 4 below.

TABLE 3

| Categories | | Redispersibility | Storage stability |
|---|---|---|---|
| Examples | 2-A1 | ○○ | ○○ |
| | 2-A2 | ○○ | ○○ |
| | 2-A3 | ○○ | ○○ |
| | 2-A4 | ○○ | ○○ |
| | 2-A5 | ○○ | ○○ |
| | 2-A6 | ○○ | ○○ |
| | 2-A7 | ○○ | ○○ |
| | 2-A8 | ○○ | ○○ |
| | 2-A9 | ○○ | ○○ |
| | 2-A10 | ○○ | ○○ |
| Comparative Examples | 2-A1 | ○ | X |
| | 2-A2 | ○ | X |

TABLE 4

| | Comparative Examples | | | | | Examples | | | | | | | | | |
|---|---|---|---|---|---|---|---|---|---|---|---|---|---|---|---|
| Categories | 2-B1 | 2-B2 | 2-B3 | 2-B4 | 2-B5 | 2-B1 | 2-B2 | 2-B3 | 2-B4 | 2-B5 | 2-B6 | 2-B7 | 2-B8 | 2-B9 | 2-B10 |
| Tensile stress (MPa) | 60 | Not measurable due to aggregation | 30 | 35 | 70 | 110 | 73 | 100 | 72 | 105 | 70 | 110 | 68 | 112 |

As described in Table 3 above, in the case of Examples 2-A1 to 2-A10 according to the present invention, the solid dispersion for curing was present in a solid state at room temperature and the storage stability was excellent, so it was found that long-term storage was easy and redispersability was excellent.

However, in the case of the liquid dispersion in which the dispersion medium is in a liquid state at room temperature (Comparative Examples 2-A1 and 2-A2), the dispersoids entangled with each other, resulting in agglomeration in the form of small lumps, which resulted in poor redispersibility. Also, it was found that the storage stability was poor due to the occurrence of aggregation and settling during long-term storage.

In addition, as described in Table 4 above, in the case of Examples 2-B1 to 2-B10 according to the present invention, it was found that the tensile stress of the cured product of the epoxy resin composition was remarkably improved to 68 Mpa or more by using a solid dispersion for curing in which the dispersoid (nanocellulose fibrils or graphene) is evenly dispersed.

However, in the case of Comparative Example 2-B1 in which simply a dispersion medium (anhydrosugar alcohol) alone was used as a curing agent, the tensile stress was significantly inferior to those of the Examples. In the case of Comparative Examples 2-B2 and 2-B3 in which a dispersion medium (anhydrosugar alcohol) alone was used as a curing agent while an additive (nanocellulose fibrils or graphene) was mixed without prior dispersion, the additive was not evenly dispersed and the tensile stress could not be measured due to the aggregation of the cured product of the epoxy resin composition to which the solid dispersions were applied.

In addition, in the case of Comparative Examples 2-B4 and 2-B5 using the dispersion in which the dispersoid was dispersed, but existed in a liquid state at room temperature, the dispersoids were entangled with each other, resulting in an agglomeration and settling in the form of small lumps. Two of the five tensile stress measurements of each specimen were impossible to measure due to aggregation, and the average value of the five tensile stresses was significantly inferior to those of the Examples. Also, an additional process of stirring must be performed before using the curing agent. When stored for a long period of time, there is a problem in that the dispersoid is agglomerated and is not well dispersed even by stirring.

3. Preparation of Dispersion Composition

Preparation of dispersion composition

Example 3-1: Dispersion Composition Comprising Nanocellulose Fibrils and Monosaccharides 100 g of glucose (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 150° C. which is equal to or higher than the melting point of glucose. Subsequently, the melted mixture was cooled to room temperature to prepare glucose in which nanocellulose fibrils were dispersed (solid dispersion composition).

Example 3-2: Dispersion Composition Comprising Nanocellulose Fibrils and Disaccharides 100 g of sucrose (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 190° C. which is equal to or higher than the melting point of sucrose. Subsequently, the melted mixture was cooled to room temperature to prepare sucrose in which nanocellulose fibrils were dispersed (solid dispersion composition).

Example 3-3: Dispersion Composition Comprising Nanocellulose Fibrils and Polysaccharides 100 g of starch (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 220° C. which is equal to or higher than the melting point of the starch. Subsequently, the melted mixture was cooled to room temperature to prepare a starch in which nanocellulose fibrils were dispersed (solid dispersion composition).

Example 3-4: Dispersion Composition Comprising Nanocellulose Fibrils and Anhydrosugar Alcohol 100 g of isosorbide (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 80° C. which is equal to or higher than the melting point of isosorbide. Subsequently, the melted mixture was cooled to room temperature to prepare isosorbide in which nanocellulose fibrils were dispersed (solid dispersion composition).

Example 3-5: Dispersion Composition Comprising Nanocellulose Fibrils and Hydrogenated Sugars 100 g of sorbitol (Samyang Corporation) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 100° C. which is equal to or higher than the melting point of sorbitol. Subsequently, the melted mixture was cooled to room temperature to prepare sorbitol in which nanocellulose fibrils were dispersed (solid dispersion composition).

Example 3-6: Dispersion Composition Comprising Nanocellulose Fibrils and Polyether Polyol 100 g of polytetrahydrofuran (weight average molecular weight: 1000 g/mol, Sigma Aldrich) and 100 g of an aqueous solution in which 1% by weight of nanocellulose fibrils were dispersed (KB101, Asia Nano Cellulose Co., Ltd.) were added to a rotary evaporator and uniformly mixed. Then, the mixture was melted while removing moisture by applying a vacuum under a temperature condition of 80° C. which is equal to or higher than the melting point of polytetrahydrofuran. Subsequently, the melted mixture was cooled to room temperature to prepare polytetrahydrofuran in which nanocellulose fibrils were dispersed (solid dispersion composition).

Example 3-7: Dispersion Composition Comprising Graphene and Monosaccharide 100 g of glucose (Samyang Corporation) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 150° C. which is equal to or higher than the melting point of glucose. Subsequently, the melted mixture was cooled to room temperature to prepare glucose in which graphene was dispersed (solid dispersion composition).

Example 3-8: Dispersion Composition Comprising Graphene and Disaccharide 100 g of sucrose (Samyang Corporation) and 100 g of an aqueous solution in which the graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 190° C. which is equal to or higher than the melting point of sucrose. Subsequently, the melted mixture was cooled to room temperature to prepare sucrose in which graphene was dispersed (solid dispersion composition).

Example 3-9: Dispersion Composition Comprising Graphene and Polysaccharide 100 g of starch (Samyang Corporation) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 220° C. which is equal to or higher than the melting point of the starch. Subsequently, the melted mixture was cooled to room temperature to prepare starch in which graphene was dispersed (solid dispersion composition).

Example 3-10: Dispersion Composition Comprising Graphene and Anhydrosugar Alcohol 100 g of isosorbide (Samyang Corporation) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 80° C. which is equal to or higher than the melting point of isosorbide. Subsequently, the melted mixture was cooled to room temperature to prepare isosorbide in which graphene was dispersed (solid dispersion composition).

Example 3-11: Dispersion Composition Comprising Graphene and Hydrogenated Sugar 100 g of sorbitol (Samyang Corporation) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 100° C. which is equal to or higher than the melting point of sorbitol. Subsequently, the melted mixture was cooled to room temperature to prepare sorbitol in which graphene was dispersed (solid dispersion composition).

Example 3-12: Dispersion Composition Comprising Graphene and Polyether Polyol 100 g of polytetrahydrofuran (weight average molecular weight: 1000 g/mol, Sigma Aldrich) and 100 g of an aqueous solution in which graphene was dispersed at 1.5 mg/mL (WDG, MExplorer Co., Ltd.) were added to a rotary evaporator and uniformly mixed. Then, the mixture was melted while removing moisture by applying a vacuum under a temperature condition of 80° C. which is equal to or higher than the melting point of polytetrahydrofuran. Subsequently, the melted mixture was cooled to room temperature to prepare polytetrahydrofuran in which graphene was dispersed (solid dispersion composition).

Comparative Example 3-1: Dispersion Composition Comprising Nanocellulose Fibrils and Polypropylene Glycol 100 g of polypropylene glycol (PPG-3000, Kumho Petrochemical) in liquid form at the room temperature and 100 g of an aqueous solution in which 1% by weight of nanocellulose fibrils were dispersed (KB101, Asia Nano Cellulose Co., Ltd.) were added to a rotary evaporator and uniformly mixed. Then, a vacuum was applied to remove moisture to prepare polypropylene glycol in which nanocellulose fibrils were dispersed (liquid dispersion composition).

Comparative Example 3-2: Dispersion Composition Comprising Graphene and Polypropylene Glycol 100 g of polypropylene glycol (PPG-3000, Kumho Petrochemical) in liquid form at the room temperature and 100 g of an aqueous solution in which graphene was dispersed at 1.5 mg/mL (WDG, MExplorer Co., Ltd.) were added to a rotary evaporator and uniformly mixed. Then, a vacuum was applied to remove moisture to prepare a polypropylene glycol in which graphene was dispersed (liquid dispersion composition).

For the dispersion compositions prepared in Examples 3-1 to 3-12 and Comparative Examples 3-1 and 3-2, redispersibility and storage stability were evaluated in the following manner, and the results are shown in Table 5 below.
[Method of Evaluating Redispersibility]
After storing the dispersion compositions prepared in Examples 3-1 to 3-12 and Comparative Examples 3-1 to 3-2 at room temperature for 24 hours, 10 g of each dispersion composition was placed in a vial containing 15 ml of water and stirred for 1 hour using a magnetic bar to prepare a specimen. Subsequently, the degree of dispersion of the dispersoid in the prepared specimen was observed with the naked eye.
- ○○: The dispersed state of the dispersoid is the same as that immediately after preparation of the dispersion composition.
- ○: The dispersed state of the dispersoid is a state in which small lumps are floating compared to immediately after preparation of the dispersion composition.
- x: The dispersed state of the dispersoid is a state in which big lumps are floating compared to immediately after preparation of the dispersion composition.
- xx: The dispersoid is insoluble in water.

[Method of Evaluating Storage Stability]
Specimens were prepared in the same manner as described in the method of evaluating redispersibility. Subsequently, each of the prepared specimens was stored at room temperature for 1 hour, and then the degree of aggregation and settling of the dispersoid was visually observed.
- ○○: The dispersoid does not aggregate and does not settle.
- ○: A small amount of dispersoid agglomerates and settles.
- x: Most of the dispersoid agglomerates and settles.

TABLE 5

| Categories | | Redispersibility | Storage stability |
|---|---|---|---|
| Examples | 3-1 | ○○ | ○○ |
| | 3-2 | ○○ | ○○ |
| | 3-3 | ○○ | ○○ |
| | 3-4 | ○○ | ○○ |
| | 3-5 | ○○ | ○○ |
| | 3-6 | ○○ | ○○ |
| | 3-7 | ○○ | ○○ |
| | 3-8 | ○○ | ○○ |
| | 3-9 | ○○ | ○○ |
| | 3-10 | ○○ | ○○ |
| | 3-11 | ○○ | ○○ |
| | 3-12 | ○○ | ○○ |
| Comparative Examples | 3-1 | ○ | X |
| | 3-2 | ○ | X |

As described in Table 5 above, in the case of Examples 3-1 to 3-12 according to the present invention, the dispersion composition was present in a solid state at room temperature and the storage stability was excellent, so it was found that long-term storage was easy and redispersability was excellent.

However, in the case of the dispersion in which the dispersion medium is in a liquid state at room temperature (Comparative Examples 3-1 and 3-2), the dispersoids entangled with each other, resulting in agglomeration in the form of small lumps, which resulted in poor redispersibility. Also, it was found that the storage stability was poor due to the occurrence of aggregation and settling during long-term storage.

The invention claimed is:
1. A solid dispersion comprising a dispersoid and a dispersion medium in which the dispersoid is dispersed,
   wherein the dispersoid is an organic particle, an inorganic particle or a mixture thereof,
   the dispersion medium is a non-aqueous dispersion medium in a solid state at room temperature,
   the solid dispersion does not comprise any dispersant or surfactant,
   the inorganic particle is selected from the group consisting of iron, aluminum, chromium, nickel, cobalt, zinc, tungsten, indium, tin, palladium, zirconium, titanium, copper, silver, gold, platinum, kaolin, clay, talc, mica, bentonite, dolomite, calcium silicate, magnesium silicate, asbestos, calcium carbonate, magnesium carbonate, barium carbonate, calcium sulfate, barium sulfate, aluminum sulfate, aluminum hydroxide, iron hydroxide, aluminum silicate, zirconium oxide, magnesium oxide, aluminum oxide, titanium oxide, iron oxide, zinc oxide, antimony trioxide, indium oxide, indium tin oxide, silicon carbide, silicon nitride, boron nitride, barium titanate, diatomite, carbon black, graphite, rock wool, glass wool, glass fiber, graphene, carbon fiber, carbon nanofibers, carbon nanotubes, an alloy of two or more metals of them or a mixture of two or more of them, the organic particle is selected from the group consisting of azo-based compounds, diazo-based compounds, condensed azo-based compounds, thioindigo-based compounds, indanthrone-based compounds, quinacridone-based compounds, anthraquinone-based compounds, benzimidazolone-based compounds, perylene-based compounds, phthalocyanine-based compounds, anthrapyridine-based compounds, dioxazine-based compounds, polyethylene resin, polypropylene resin, polyester resin, nylon resin, polyamide resin, aramid resin, acrylic resin, vinylon resin, urethane resin, melamine resin, polystyrene resin, polylactic acid, acetate fiber, cellulose, lignin, chitin, chitosan, starch, polyacetal, polycarbonate, polyphenylene ether, polyether ether ketone, polyether ketone, polybutylene terephthalate, polyethylene naphthalate, polybutylene naphthalate, polysulfone, polyphenylene sulfide, polyimide or mixtures thereof, and the dispersion medium is one or more selected from the group consisting of polyether polyols, polyester polyols, hydrogenated sugars, alkane diols, phenol-based compounds, imidazole-based compounds, acid anhydride-based compounds, anhydrosugar alcohols or combinations thereof.

2. The solid dispersion according to claim 1, wherein the content of the dispersoid is 0.0001 parts by weight to 95 parts by weight based on 100 parts by weight of the dispersion medium.

3. The solid dispersion according to claim 1, which is a solid dispersion at room temperature for chain extension.

4. A chain-extended polyurethane, which is prepared by the reaction of a polyurethane prepolymer and the solid dispersion of claim 3.

5. A method for preparing a chain-extended polyurethane comprising
   (1) a step of adding the solid dispersion of claim 3 to a polyurethane prepolymer; and
   (2) a step of reacting the resulting mixture of step (1).

6. The method of claim 5, wherein the polyurethane prepolymer is obtained by reacting a polyol—which are vacuum-dried at 50 to 100° C. for 12 to 36 hours—and a polyisocyanate at a temperature of 50 to 100° C. for 0.1 to 5 hours under a nitrogen atmosphere.

7. The method of claim 5, wherein the step of the reacting the resulting mixture of step (1) is conducted by curing the resulting mixture for 10 to 30 hours at a temperature of 80 to 200° C.

8. The solid dispersion according to claim 1, which is a solid dispersion at room temperature for curing.

9. An epoxy resin composition comprising an epoxy resin; and the solid dispersion of claim 8.

10. A cured product obtained by curing the epoxy resin composition of claim 9.

11. A molded article comprising the cured product of claim 10.

12. A method for preparing an epoxy resin composition comprising a step of mixing an epoxy resin and the solid dispersion of claim 8.

13. A dispersion composition comprising the solid dispersion of claim 1.

14. A method for preparing the solid dispersion according to claim 1 comprising
   a step of mixing the dispersoid and the dispersion medium; and
   a step of melting the dispersion medium in a mixture.

15. The method of claim 14, wherein the step of melting the dispersion medium in the mixture is conducted by melting the mixture while removing moisture by applying a vacuum at a temperature equal to or higher than the melting point of the dispersion medium.

16. A solid dispersion comprising a dispersoid and a dispersion medium in which the dispersoid is dispersed,
   wherein the dispersoid is an organic particle, an inorganic particle or a mixture thereof,
   the dispersion medium is a non-aqueous dispersion medium in a solid state at room temperature,
   the solid dispersion does not comprise any dispersant or surfactant,
   the inorganic particle is selected from the group consisting of iron, aluminum, chromium, nickel, cobalt, zinc, tungsten, indium, tin, palladium, zirconium, titanium, copper, silver, gold, platinum, kaolin, clay, talc, mica, bentonite, dolomite, calcium silicate, magnesium silicate, asbestos, calcium carbonate, magnesium carbonate, barium carbonate, calcium sulfate, barium sulfate, aluminum sulfate, aluminum hydroxide, iron hydroxide, aluminum silicate, zirconium oxide, magnesium oxide, aluminum oxide, titanium oxide, iron oxide, zinc oxide, antimony trioxide, indium oxide, indium tin oxide, silicon carbide, silicon nitride, boron nitride, barium titanate, diatomite, carbon black, graphite, rock wool, glass wool, glass fiber, graphene, carbon fiber, carbon nanofibers, carbon nanotubes, an alloy of two or more metals of them or a mixture of two or more of them,
   the organic particle is selected from the group consisting of azo-based compounds, diazo-based compounds, condensed azo-based compounds, thioindigo-based compounds, indanthrone-based compounds, quinacridone-based compounds, anthraquinone-based compounds, benzimidazolone-based compounds, perylene-based compounds, phthalocyanine-based compounds, anthrapyridine-based compounds, dioxazine-based compounds, polyethylene resin, polypropylene resin, polyester resin, nylon resin, polyamide resin, aramid resin, acrylic resin, vinylon resin, urethane resin, melamine resin, polystyrene resin, polylactic acid, acetate fiber, cellulose, lignin, chitin, chitosan, starch, polyacetal, polycarbonate, polyphenylene ether, polyether ether ketone, polyether ketone, polybutylene terephthalate, polyethylene naphthalate, polybutylene naphthalate, polysulfone, polyphenylene sulfide, polyimide or mixtures thereof, and
   wherein the dispersion medium is one or more selected from the group consisting of tetritan, pentitan, heptitan, sorbitan, mannitan, iditan, galactan, isosorbide, isomannide, isoidide, tetritol, pentitol, heptitol, sorbitol, mannitol, iditol, galactitol, modified polypropylene glycol, polytetramethylene ether glycol, butylene adipate diol, 1,6-hexanadipate diol, 1,4-butanediol, 1,6-hexanediol, 1,9-nonanediol, poly(ethylene glycol)diamine, (R)-(+)-1,1'-binaphthyl-2,2'-diamine, (S)-(−)-1,1'-binaphthyl-2,2'-diamine, 1,1'-binaphthyl-2,2'-diamine, 4-ethoxybenzene-1,2-diamine, (1R,2R)—N,N'-dimethyl-1,2-diphenylethane-1,2-diamine, N,N-bis(4-butylphenyl)benzene-1,4-diamine, 2,3-xylenol, 2,4-xylenol, 2,5-xylenol, 2,6-zylenol, 3,4-zylenol, 3,5-zylenol, 2,5-dimethylphenol, 2,3-dimethylphenol, imidazole, 1-(2-hydroxyethyl)imidazole, imidazole trifluoro methanesulfonate, imidazole-2-carboxylic acid, 4-bromo-1H-imidazole, N-benzyl-2-nitro-1H-imidazole-1-acetamide, 2-chloro-1H-imidazole, imidazole-d, imidazole-N, imidazole-2-C,N, (2-dodecen-1-yl) succinic anhydride, maleic anhydride, succinic anhydride, phthalic anhydride, glutaric anhydride, 3,4,5,6-tetrahydrophthalic anhydride, diglycolic anhydride, itaconic anhydride, trans-1,2-cyclohexanedicarboxylic anhydride, 2,3-dimethylmaleic anhydride, 3,3-tetramethylene glutaric anhydride, stearic anhydride, cis-aconitic anhydride, trimellitic anhydride chloride, phenylsuccinic anhydride, 3,3-dimethylglutaric anhydride, methylsuccinic anhydride or combinations thereof.

17. A dispersion composition comprising the solid dispersion of claim 16.

\* \* \* \* \*